United States Patent
Pruitt et al.

(10) Patent No.: US 9,648,809 B2
(45) Date of Patent: May 16, 2017

(54) HYDRAULIC CONDITIONER ROLL TENSION IN PULL-TYPE MOWER CONDITIONER

(71) Applicant: AGCO Corporation, Hesston, KS (US)

(72) Inventors: Martin E. Pruitt, Hesston, KS (US); Douglas Ray Treffer, Newton, KS (US); Shane A. Bollinger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/310,900

(22) PCT Filed: May 11, 2015

(86) PCT No.: PCT/US2015/030130
§ 371 (c)(1),
(2) Date: Nov. 14, 2016

(87) PCT Pub. No.: WO2015/183532
PCT Pub. Date: Dec. 3, 2015

(65) Prior Publication Data
US 2017/0079209 A1    Mar. 23, 2017

Related U.S. Application Data

(60) Provisional application No. 62/004,606, filed on May 29, 2014.

(51) Int. Cl.
*A01D 43/00* (2006.01)
*A01D 43/10* (2006.01)
(Continued)

(52) U.S. Cl.
CPC .............. *A01D 43/10* (2013.01); *A01B 63/32* (2013.01); *A01D 82/02* (2013.01); *A01D 2101/00* (2013.01)

(58) Field of Classification Search
CPC .... A01B 63/32; A01D 43/105; A01D 43/102; A01D 43/107; A01D 43/085;
(Continued)

(56) References Cited

U.S. PATENT DOCUMENTS 4,099,364 A    7/1978 Kanengieter et al.
4,546,599 A    10/1985 Cicci et al.
(Continued)

OTHER PUBLICATIONS

European Patent Office, International Search Report for International Application No. PCT/US2015/030130, mail date Jul. 15, 2015.

*Primary Examiner* — Robert Pezzuto

(57) ABSTRACT

A pull-type mower conditioner includes a crop cutting assembly that severs crop material from the ground and a lift mechanism configured to raise and lower the crop cutting assembly to a desired height having at least one lift cylinder and a hydraulic lift circuit supplying hydraulic fluid to the at least one lift cylinder. The mower conditioner also includes a conditioning mechanism receiving the severed crop material from the crop cutting assembly. The conditioning mechanism includes a pair of counter-rotating conditioning rolls to condition the crop material and a tensioning assembly that urges the conditioning rolls relatively toward one another and resists their separation. The tensioning assembly includes a pair of hydraulic tension cylinders and a hydraulic conditioner circuit configured to supply hydraulic fluid to the tension cylinders. The hydraulic tension circuit has a supply line leading to a supply valve, wherein the supply line connects to the lift circuit.

5 Claims, 2 Drawing Sheets

(51) Int. Cl.
    *A01D 82/02*    (2006.01)
    *A01B 63/32*    (2006.01)
    *A01D 101/00*   (2006.01)

(58) Field of Classification Search
    CPC ...... A01D 43/086; A01D 43/00; A01D 43/10;
           A01D 82/00; A01D 82/60; A01D 2101/00
    USPC .......... 56/1, 10.2 A–10.2 D, 16.4 A–16.4 C,
             56/10.2 R, 10.6, 13.9, 157, 51, 53, 60;
                                          460/1, 7, 25
    See application file for complete search history.

(56)            References Cited

U.S. PATENT DOCUMENTS

| | | | | |
|---|---|---|---|---|
| 6,050,070 | A * | 4/2000 | Cook | A01D 82/00 |
| | | | | 56/1 |
| 6,158,201 | A * | 12/2000 | Pruitt | A01D 43/10 |
| | | | | 56/13.9 |
| 6,584,755 | B2 * | 7/2003 | Holtkotte | A01D 43/085 |
| | | | | 56/10.2 B |
| 8,166,736 | B2 | 5/2012 | Nickel et al. | |
| 8,220,234 | B2 * | 7/2012 | Pruitt | A01D 43/10 |
| | | | | 56/16.4 A |
| 8,656,694 | B2 * | 2/2014 | Pruitt | A01D 43/105 |
| | | | | 56/10.6 |
| 8,833,046 | B2 * | 9/2014 | Barnett | A01D 34/71 |
| | | | | 56/157 |

* cited by examiner

HYDRAULIC CONDITIONER ROLL TENSION IN PULL-TYPE MOWER CONDITIONER

RELATED APPLICATION

Under provisions of 35 U.S.C. §119(e), Applicants claim the benefit of U.S. Provisional Application No. 62/004,606 entitled HYDRAULIC CONDITIONER ROLL TENSION IN PULL-TYPE MOWER CONDITIONER filed May 29, 2014, which is incorporated herein by reference.

BACKGROUND OF THE INVENTION

Field of Invention

This invention relates to the field of pull-type farm implements and, more particularly, to a method and apparatus for tensioning conditioning rolls in a pull-type implement.

Description of Related Art

Self-propelled and pull-type conditioning mowers are used to cut and condition standing crop in a field. As crop material is severed from the field by either a rotary or sickle pull type mower conditioner, it passes through a pair of counter-rotating conditioning rolls before being returned to the ground either in the form of a windrow or swath. The conditioning rolls are typically ribbed and intermeshed with each other to crimp the stems of the crop material as they pass between the rollers.

The conditioning rolls of self-propelled conditioning mowers are often equipped with hydraulic roll tensioning mechanism which provides a controlled means to vary the amount of pressure applied to the conditioning rolls for improved drying characteristics such as illustrated in commonly-assigned U.S. Pat. No. 8,166,736 entitled Crop-Conditioning Apparatus Having Hydraulic Tension Mechanism. However, pull-type mower conditioners typically use springs to apply the necessary force on the conditioning rollers to condition the crop because many tractors lack the means to supply the necessary hydraulic pressure to the pull-type implement as some tractors only have enough hydraulic circuits available to operate primary functions. To change the amount of force on the conditioning rolls, adjustment of the springs is required, which can be labor intensive and time consuming. Additionally, due to the limitations of the springs, there are limitations to the amount of force that can be applied to the conditioning rolls.

OVERVIEW OF THE INVENTION

In one embodiment, the invention is directed to a pull-type mower conditioner configured to be pulled across a field by a towing vehicle and capable of severing standing crop material from the ground and conditioning the stems of such crop material as it is passed rearwardly through mower conditioner. The mower conditioner includes a crop cutting assembly that severs crop material from the ground as the mower conditioner is pulled across a field, and a lift mechanism configured to raise and lower the crop cutting assembly to a desired height comprising at least one lift cylinder and a hydraulic lift circuit supplying hydraulic fluid to the at least one lift cylinder. The mower conditioner also includes a conditioning mechanism receives the severed crop material from the crop cutting assembly. The conditioning mechanism includes a pair of counter-rotating conditioning rolls to condition the crop material and a tensioning assembly that urges the conditioning rolls relatively toward one another and resists their separation. The tensioning assembly includes a pair of hydraulic tension cylinders located at opposite ends of the one of the pair of conditioning rolls and a hydraulic conditioner circuit configured to supply hydraulic fluid to the tension cylinders. The hydraulic tension circuit has a supply line leading to a supply valve. The supply line connects to the lift circuit to supply hydraulic fluid for the conditioner circuit.

In another embodiment, the invention is directed to a method for tensioning counter-rotating conditioning rolls with hydraulic tension cylinders in a tensioning assembly on a pull-type mower conditioner. The mower conditioner is configured to be pulled across a field by a towing vehicle and is capable of severing standing crop material from the ground and conditioning the crop material as it is passed rearwardly through the mower conditioner. The tensioning assembly is configured to urge the conditioning rolls relatively toward one another and resists their separation. The method includes raising the mower conditioner using a lift mechanism configured to raise and lower the mower conditioner to a desired height, the lift mechanism comprising at least one lift cylinder and a hydraulic lift circuit supplying hydraulic fluid to the at least one lift cylinder. The method also includes pressurizing a hydraulic conditioner circuit by opening a supply valve to allow hydraulic fluid to be transferred from the lift circuit to the conditioner circuit with the mower conditioner in the raised position.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Figure 1:
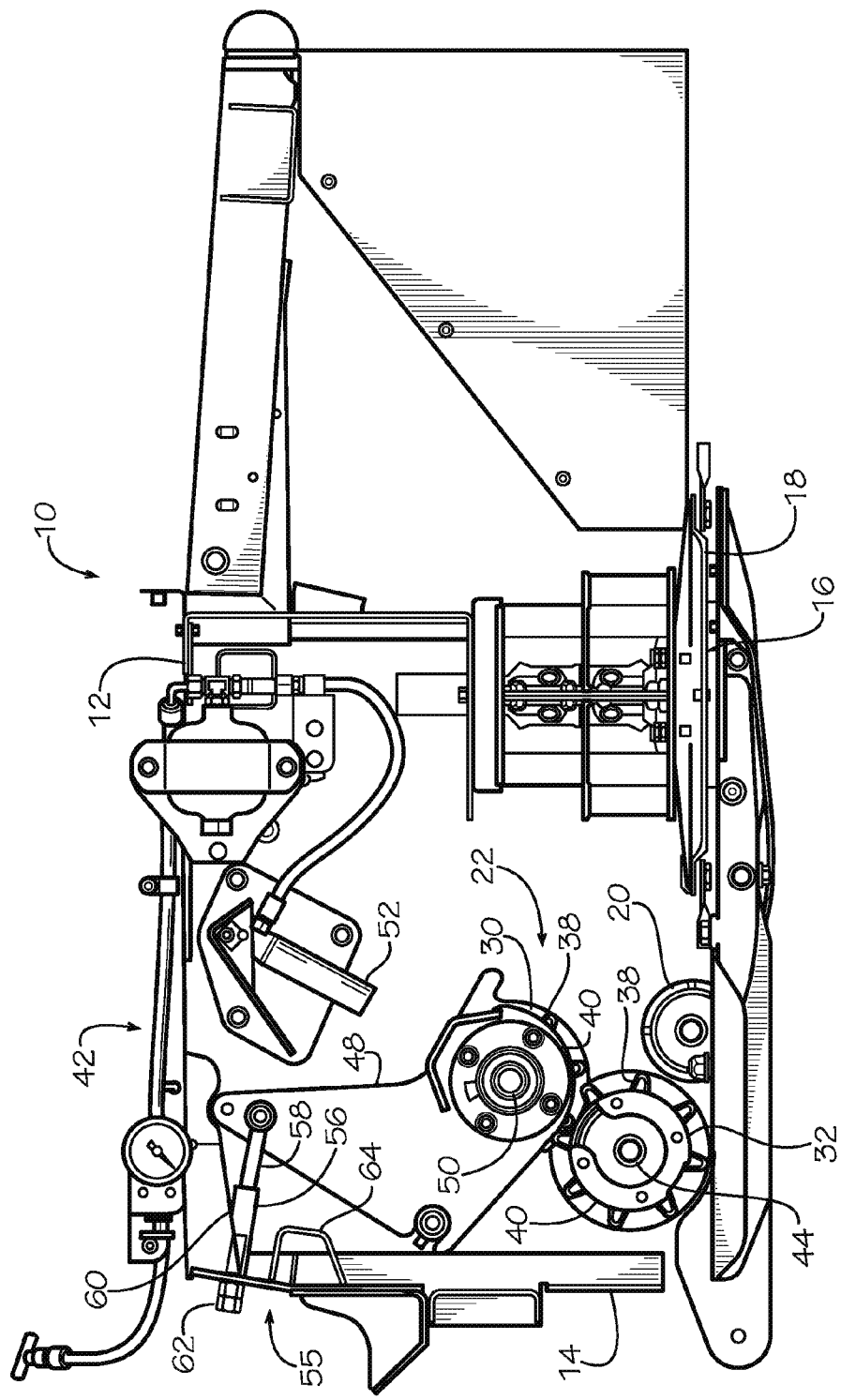
FIG. 1 is a side elevation view of a self-propelled harvester in the nature of a windrower incorporating the principles of the present invention.

The drawing figures do not limit the present invention to the specific embodiments disclosed and described herein. The drawings are not necessarily to scale, emphasis instead being placed upon clearly illustrating the principles of the preferred embodiment. Corresponding reference characters indicate corresponding parts throughout the views of the drawings.

DETAILED DESCRIPTION OF THE PREFERRED EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The pull-type mower conditioner 10 in FIG. 1 comprises a header 12 designed to be pulled across a field by a towing vehicle (not shown) and is capable of severing standing crop materials from the ground as, conditioning the stems of such materials as they are passed rearwardly through mower conditioner 10, and then returning the conditioned materials to the ground in a windrow or swath. The header 12 may have a generally open, box-like frame 14 that supports a laterally extending crop cutting assembly 16. In the illustrated embodiment, the cutting assembly 16 is in the form of a rotary cutter bed located adjacent the front of the framework for severing crop from the ground as the mower conditioner 10 is pulled across a field. The rotary cutter bed 16 includes a series of rotary cutters 18 spaced across the path of travel of the mower-conditioner 10 and each being rotatable about its own upright axis as is well known in the art. However, one skilled in the art will understand that the cutting assembly 16 may include a sickle-type cutter bed without departing from the scope of the invention. A helper roll 20 is provided for urging crop material cut by the cutter bed 16 rearward toward a conditioning mechanism 22 of the mower conditioner 10.

Figure 2:
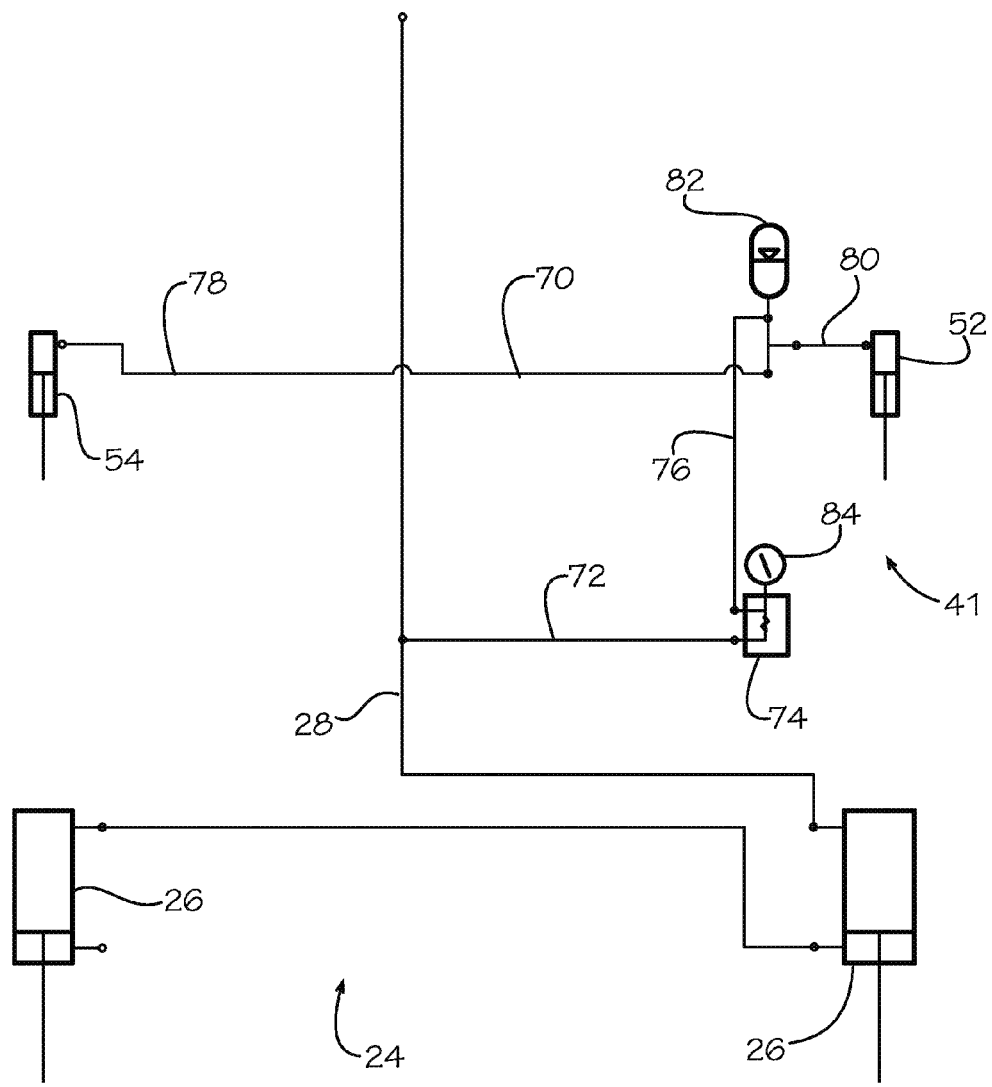
FIG. 2 is a schematic illustration of a simplified hydraulic circuit for applying tensioning force to the rolls.

As is known in the art, the mower conditioner 10 has a lift mechanism 24, shown schematically in FIG. 2, configured to raise and lower the header 12 to a desired cutting height or for raising the header 12 to a transport condition. The lift mechanism 24 includes a pair of lift cylinders 26 connected to a hydraulic lift circuit 28, in communication with the towing vehicle. The hydraulic lift circuit 28 supplies the necessary hydraulic fluid to the lift cylinders 26 for operation of the lift mechanism 24. Suitable lift mechanisms 24 for mower conditioners are well known in the art and need not be discussed in further detail.

Returning to FIG. 1, the conditioning mechanism 22 includes a pair of counter-rotating conditioning rolls 30, 32. Conditioning rolls 30, 32 may have non-compressible surfaces made of a hard material and may take the form of fluted or ribbed steel rolls of the type used for many years in the industry. Alternately, conditioning rolls 30, 32 may have somewhat compressible surfaces made of rubber or a combination of rubber and steel. One skilled in the art will understand that any available conditioning rolls may be used on the mower conditioner 10 without departing from the scope of the invention. In the illustrated embodiment, each of the conditioning rolls 30, 32 thus has a series of radially outwardly projecting, somewhat triangular in cross section and relatively narrow ribs 38 that extend along the length of the roll in a helical pattern. Ribs 38 project outwardly from a cylindrical core 40 of each roll and are spaced around the roll in such a manner that the ribs 38 on top roll 30 may intermesh with the ribs 38 on bottom roll 32 during operation. The rolls 30, 32 could be configured to be non-intermeshing to only provide a crush instead of a crimp.

The conditioning mechanism 22 has a tensioning assembly broadly denoted by the numeral 42 that urges conditioning rolls 30, 32 relatively toward one another and resists their separation. In the illustrated embodiment, conditioning rolls 30, 32 are mounted in such a way that upper roll 30 can move toward and away from the lower roll 32 to a limited extent, while the vertical position of lower roll 30 remains fixed. One skilled in the art will recognize that this relationship could be reversed or that both rolls could be configured to move. Different crop conditions may call for different pressure settings on the rolls 30, 32 as well as different gaps, if any, between the rolls. Moreover, there may be times when the operator simply wishes to change the degree or severity of conditioning of the crop materials. The present invention affords greater flexibility in this respect.

The details of one embodiment of construction permitting such mounting arrangement and movement is illustrated in FIG. 1, it being noted that only one end of the rolls 30, 32 is illustrated in the figure. Thus, the following description will focus on the right ends of the rolls, with the understanding that corresponding arrangements are provided at the left ends. It is also to be understood that other means for mounting and moving the rolls may be used using sound engineering judgment.

The rolls 30, 32 are provided with stub shafts projecting outwardly from opposite ends thereof as exemplified by the stub shaft 44 of bottom conditioning roll 32. The stub shaft 44 of bottom conditioning roll 32 is journaled by suitable bearings that are in turn fixedly attached to the frame such that the axis of rotation of the bottom conditioning roll 32 does not move in any direction. On the other hand, the stub shaft 50 of the top conditioning roll 30 is journaled by suitable bearings and is attached to a movable support assembly 48.

Tension is applied to the upper roll 30 by single-acting hydraulic tension cylinders 52, 54 located at opposite ends of the top conditioning roll 30 that squeeze the rolls 30, 32 together to the extent permitted by adjustable stops in the support assembly used to set a running gap between the rolls. In one embodiment, a running gap can be established and adjusted between conditioning rolls 30, 32 with a gap setting mechanism 55. The gap setting mechanism 55 has an elongated member 56 having two relatively telescopic parts, namely an inner elongated shank 58 and an outer elongated sleeve 60 encircling inner shank 58 and carries an adjusting nut 62 at a threaded end 64. Thus, adjusting the position of nut 62 on inner shank 58 changes the position of sleeve 60 along the length of shank 58. In the opposite direction, to limit the extent of upward movement of the upper conditioning roll 30 away from lower conditioning roll 32, a stop bracket 64 is disposed to abut the support assembly as illustrated in FIG. 1, for example. However, one skilled in the art will understand that other means for the gap setting mechanism 55 may be used using sound engineering judgment.

Turning again to FIG. 2, in addition to the tension cylinders 52, 54, the tensioning assembly 42 comprises a hydraulic conditioner circuit 70 configured to supply hydraulic fluid to the tension cylinders 52, 54. The hydraulic tension circuit 70 includes a supply line 72 leading to a normally closed valve supply valve 74. According to the invention, the supply line 72 of the tension circuit 70 taps into the lift circuit 28 of the mower conditioner 10 so that opening the supply valve 74 allows transfer of hydraulic fluid between the lift circuit 28 and the conditioner circuit 70.

The supply line 72 feeds a tension line 76 which is downstream from the supply valve 74. The tension line branches into left and right tension lines 78, 80 leading to the tension cylinders 52, 54 so that both cylinders 52, 54 preferably receive pressurized oil at substantially identical pressures. A suitable gas pressure accumulator 82, which may take the form of a number of readily commercially available units, is connected in communication with the two cylinders 52, 54 for cushioning the conditioner circuit. A pressure-indicating meter 84 indicates pressure of the hydraulic fluid trapped within the conditioner circuit 70 when the supply valve 74 is closed.

Operation

To prepare the mower conditioner 10 for conditioning operations, the operator must select the desired tension applied to the conditioning rolls 30, 32 by pressurizing the conditioner circuit 70 to the desired pressure. Hydraulic pressure is supplied to the conditioner circuit 70 by the lift circuit 28 of the pull-type mower conditioner 10, since the pressure needed to raise and maintain the header 12 is greater than what is required to charge the hydraulic conditioner circuit 70.

With the header 12 in the raised position, the supply valve 74 is opened to allow hydraulic fluid to be transferred between the lift circuit 28 and the conditioner circuit 70. Meter 84 may be used to determine when the desired pressure level has been reached, at which time supply valve 74 may be closed to trap oil in tension cylinders 52, 54 at the desired level. As the conditioner circuit 70 is being charged, fluid is transferred out of the lift circuit 28, which gradually lowers the header 12 to the ground.

If, for any reason, it is necessary to reduce the pressure level in the tension cylinders 52, 54 and the hydraulic conditioning circuit 70, the header 12 is lowered to the ground and the hydraulic circuit of the towing vehicle is placed in the float position. This assures that the pressure in the lift circuit 28 will be lower than the pressure in the conditioning circuit 70. The supply valve 74 is opened and fluid is transferred from the conditioner circuit 70 into the lift circuit 28 and back to the towing vehicle. When the desired pressure is achieved, the supply valve 74 is closed.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A pull-type mower conditioner configured to be pulled across a field by a towing vehicle and capable of severing standing crop material from the ground and conditioning the crop material as it is passed rearwardly through mower conditioner, the mower conditioner comprising:
   a crop cutting assembly that severs crop material from the ground as the mower conditioner is pulled across a field;
   a lift mechanism configured to raise and lower the crop cutting assembly to a desired height comprising at least one lift cylinder and a hydraulic lift circuit supplying hydraulic fluid to the at least one lift cylinder;
   a conditioning mechanism receiving the severed crop material from the crop cutting assembly, the conditioning mechanism comprising:
      a pair of counter-rotating conditioning rolls to condition the crop material;
      a tensioning assembly that urges the conditioning rolls relatively toward one another and resists their separation, the tensioning assembly comprising:
         a pair of hydraulic tension cylinders located at opposite ends of one of the pair of conditioning rolls; and
         a hydraulic conditioner circuit configured to supply hydraulic fluid to the tension cylinders, the hydraulic tension circuit comprising a supply line leading to a supply valve, wherein the supply line taps into the lift circuit so that opening the supply valve allows transfer of hydraulic fluid between the lift circuit and the conditioner circuit.

2. The pull-type mower conditioner of claim 1 wherein one of the conditioning rolls has a fixed axis and the other of the conditioning rolls is mounted such that its axis can be moved toward or away from the axis of the first of the conditioning rolls.

3. The pull-type mower conditioner of claim 1 further comprising a gap setting mechanism to set an adjustable running gap between the pair of conditioning rolls.

4. The pull-type mower conditioner of claim 1 wherein the conditioner circuit further comprises a pressure accumulator in communication with the tension cylinders.

5. A method for tensioning counter-rotating conditioning rolls with hydraulic tension cylinders in a tensioning assembly on a pull-type mower conditioner, the mower conditioner configured to be pulled across a field by a towing vehicle and capable of severing standing crop material from the ground and conditioning the crop material as it is passed rearwardly through mower conditioner, wherein the tensioning assembly urges the conditioning rolls relatively toward one another and resists their separation, the method comprising:
   raising the mower conditioner using a lift mechanism configured to raise and lower the mower conditioner to a desired height, the lift mechanism comprising at least one lift cylinder and a hydraulic lift circuit supplying hydraulic fluid to the at least one lift cylinder; and
   with the mower conditioner in the raised position, pressurizing a hydraulic conditioner circuit by opening a supply valve to allow hydraulic fluid to be transferred from the lift circuit to the conditioner circuit.

* * * * *